VARIABLE INDUCTOR AND CAPACITOR TUNING APPARATUS

Filed Aug. 23, 1963 3 Sheets-Sheet 1

INVENTORS
BERNARD J. BISNETT
RALPH M. HEINTZ
BY John J. Leavitt

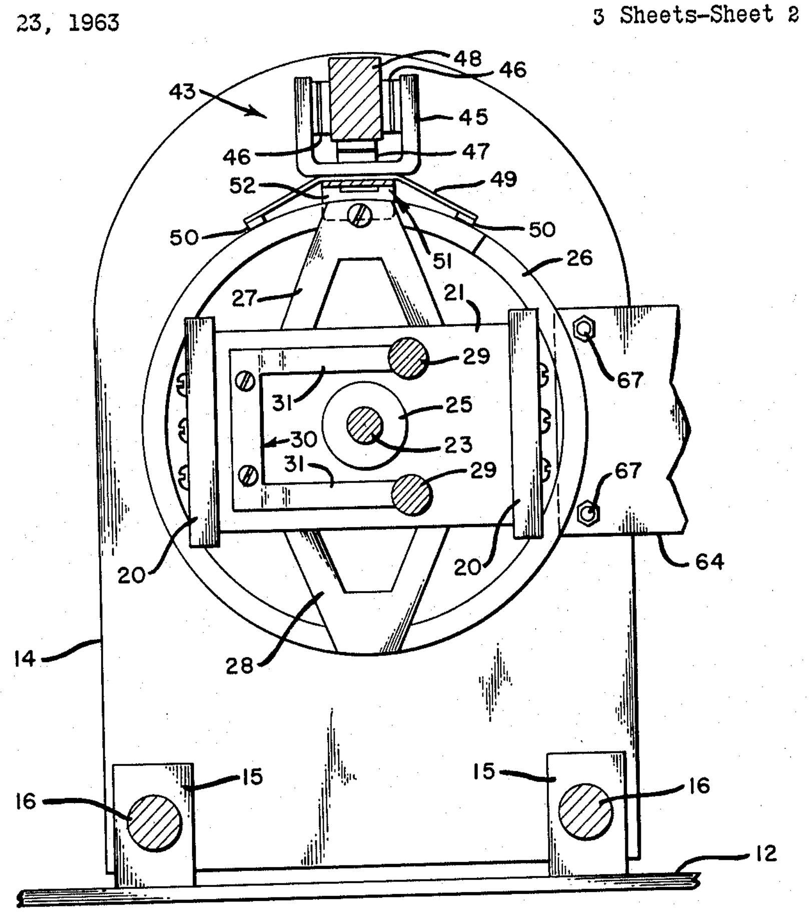
FIG-2
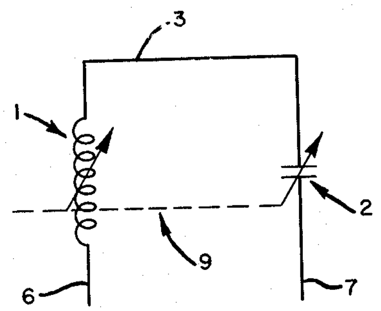
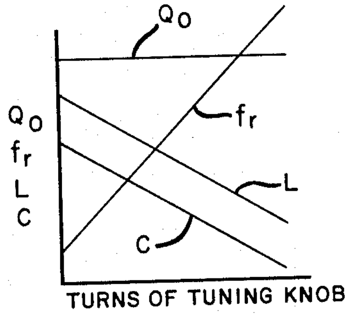
FIG-4
FIG-3
*INVENTORS*
BERNARD J. BISNETT
RALPH M. HEINTZ
BY John J. Leavitt

VARIABLE INDUCTOR AND CAPACITOR TUNING APPARATUS

Filed Aug. 23, 1963

INVENTORS
BERNARD J. BISNETT
RALPH M. HEINTZ
BY John J. Leavitt

United States Patent Office 3,260,973

Patented July 12, 1966

3,260,973

VARIABLE INDUCTOR AND CAPACITOR TUNING APPARATUS

Bernard J. Bisnett and Ralph M. Heintz, Los Gatos, Calif., assignors to Linear Systems, Inc., Los Gatos, Calif., a corporation of California Filed Aug. 23, 1963, Ser. No. 304,126

2 Claims. (Cl. 334—69)

This invention relates to a method and apparatus for tuning resonant circuits, and more particularly to a method and apparatus for changing the resonant frequency of a given circuit over a broad range of frequencies while maintaining the Q of the circuit substantially constant.

A brief summary of some of the basic principles governing operation of resonant circuits will aid in understanding the method and apparatus which will be hereinafter discussed in specific detail.

It is now well known that a circuit comprising a capacitor and an inductor is resonant at some particular alternating current frequency. This condition applies whether the capacitor and inductor are in series or in parallel. Both such series and parallel circuits are now commonly referred to as resonant circuits and it is to these circuits, particularly the parallel or resonant tank circuit, that the present invention pertains.

In a resonant circuit, the resonant frequency ($f_x$), capacitance (C) and inductance (L) are related to each other in accordance with the terms of the following equation:

$$f_r=\frac{1}{2\pi\sqrt{LC}}$$

Thus, it is well known that a resonant circuit can be tuned; that is, the resonant frequency can be changed by changing either the capacitance or the inductance, and normally such tuning is in fact accomplished by changing one or the other of these variables. Resonant circuits are primarily used as selective circuits. More specifically, as is well known in the arrt, in a parallel resonont circuit the total circuit impedance is maximum at resonant frequency and decreases at frequencies above or below resonance. In a series resonant circuit, the current is maximum at resonant frequency and decreases at frequencies above or below resonant frequency. Thus, a curve of impedance or current versus frequency will peak at resonant frequency and decrease on each side thereof. It is therefore clear that the selectivity of the circuit depends on the sharpness of the peak of such curves. It is well known that the selectivity and the efficiency of a resonant circuit are directly proportional to the Q of the circuit at resonant frequency. In other words, the higher the Q the higher the selectivity and the higher the efficiency. The Q of a resonant circuit at resonant frequency (Q*o*) is defined as follows:

$$Qo=\frac{1}{R}\sqrt{\frac{L}{C}}$$

where R is the total resistance of the circuit, L is the inductance, and C is the capacitance.

According to the preceding equation it will be noted that Q*o* is a function of the ratio of *L/C*. Normally a resonant circuit is designed to have a specific Q*o* value which is optimum for a particular purpose. In some cases, the resonant circuit may be designed to have the maximum possible value of Q*o* to achieve maximum selectivity as previously described. In other cases a lower Q may be selected to optimize the overall operation of the resonant circuit in cooperation with other associated circuitry. In any case, if the resonant frequency of the circuit is changed in conventional manner by changing either the capacitance (C) or inductance (L) separately, the ratio of *L/C* will change and therefore Q*o* will change from the design optimum.

It is an object of this invention to provide a method of tuning a resonant circuit in a manner which maintains a substantially constant ratio of *L/C* throughout a broad range of resonant frequencies through which the circuit may be tuned.

More specifically, an object of the invention is to provide a method of increasing the resonant frequency of a circuit by decreasing both the capacitance and inductance by the same factor; and of decreasing the resonant frequency by increasing both the capacitance and inductance by the same factor, whereby in either case the ratio of *L/C* remains substantially constant.

Another object of the invention is to provide a resonant circuit comprising apparatus for changing the capacitance and inductance of the circuit in direct proportion one to the other.

A further object of the invention is to provide a resonant circuit comprising apparatus for automatically changing the capacitance and inductance of the circuit simultaneously in direct proportion one to the other.

An additional object of the invention is to provide a method and apparatus for tuning a resonant circuit over a broad range of frequencies while maintaining the Q of the circuit substantially constant.

Other and further objects and features of advantage will be apparent to those skilled in the art from the following detailed description wherein reference is made to the accompanying drawings in which:

FIGURE 2 is a sectional view on the line 2—2 of FIGURE 1;

FIGURE 3 is wiring diagram representative of apparatus according to the invention;

FIGURE 4 is a graph showing Q*o*, $f_r$, L, and C curves versus turns of the tuning knob of the apparatus;

Figure 1:
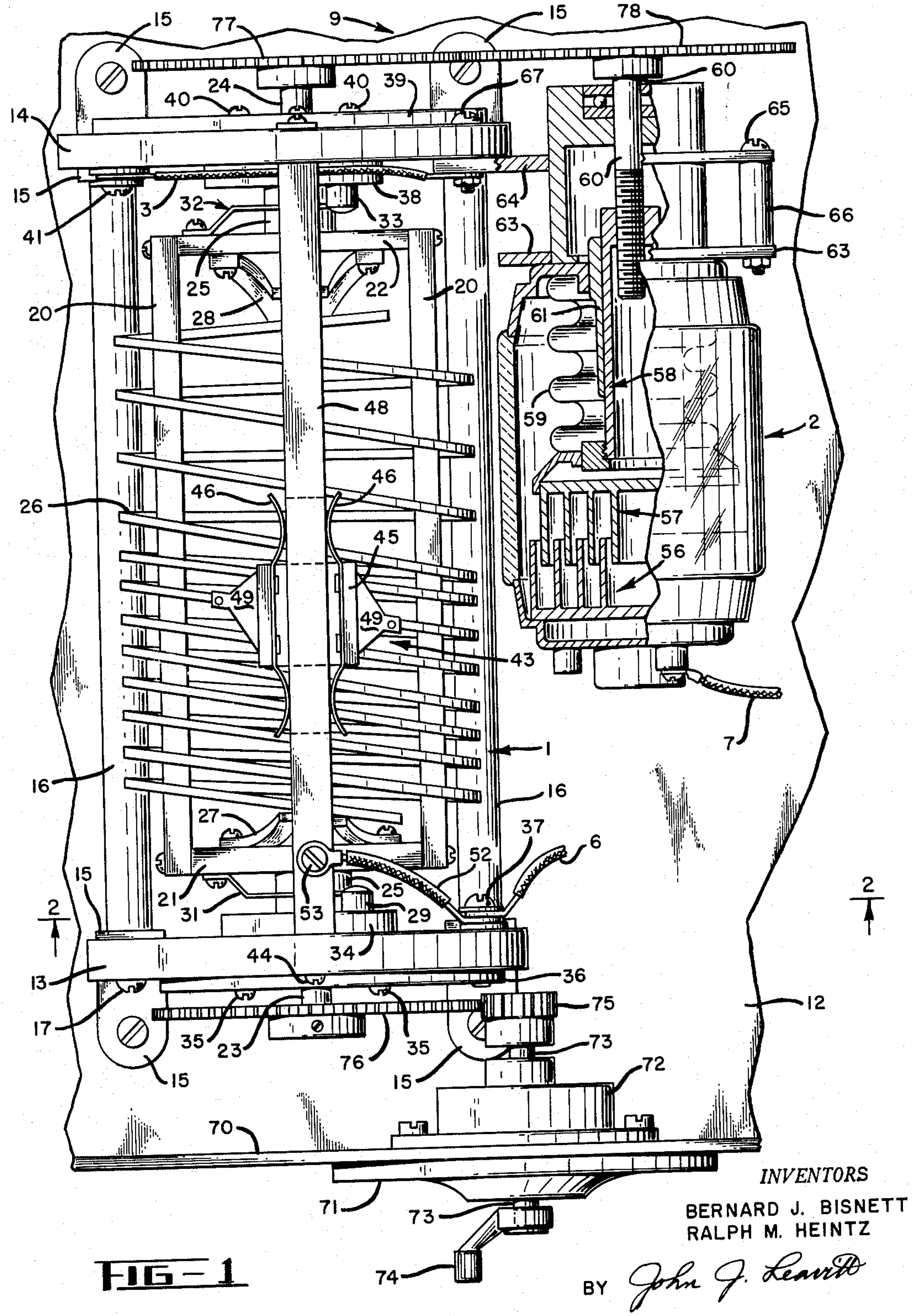
FIGURE 1 is a top plan view of one embodiment of a resonant circuit and tuning apparatus according to the invention.
Figure 5:
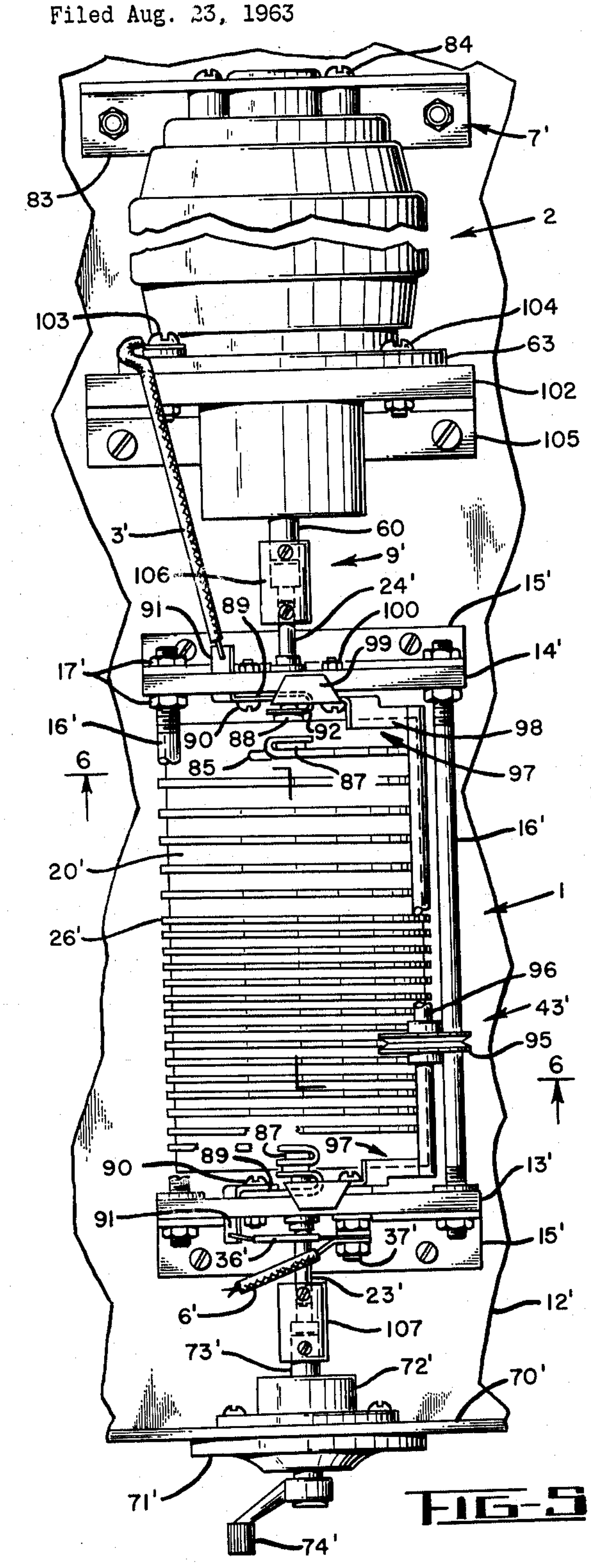
FIGURE 5 is a top plan view of another embodiment of a resonant circuit and tuning apparatus according to the invention.

Referring in more detail to the drawings, FIGURE 3 shows a circuit diagram representative of the apparatus in both the embodiment of FIGURE 1 and the embodiment of FIGURE 5. It will be seen that the circuit comprises an adjustable inductor 1, and an adjustable capacitor 2. The inductor is connected to the capacitor by a line 3. The inductor and capacitor have terminal lines 6 and 7, respectively. The means for adjusting the inductor and capacitor are interconnected for simultaneous operation by a mechanism indicated by the dashed line 9. The various line portions of the circuit are individually designed in order that the parts of the apparatus may hereinafter be more clearly related to the circuit diagram. Obviously, the resonant circuit of FIGURE 3 may be connected to conventional related circuitry so as to provide either a parallel resonant circuit or a series resonant circuit.

A primary feature of the invention resides in the method and apparatus for adjusting the inductor 1 and capacitor 2 in a manner which retain the *L/C* ratio substantially constant. In more detail, a primary feature of the invention is to provide a method and apparatus for adjusting a resonant circuit in such a way that the inductance (L), capacitance (C), resonant frequency ($f_r$), and the Q of the circuit at resonance (Q*o*) are all related in the manner shown qualitatively in FIGURE 4.

More specifically, it will be seen in FIGURE 4 that the adjustable inductor and capacitor are so designed that movement of the tuning knob provides an inductance curve L and a capacitance curve C which are substantially parallel to each other throughout the designed range of frequency variation. The circuit is also designed so that the resistance of the inductor is relatively small compared to the total resistance of the circuit so that changing the effective length of the induction coil to change the inductance has a negligible effect on the total resistance (R). Therefore, since $$Q_0=\frac{1}{R}\sqrt{\frac{L}{C}}$$

the effect of a substantially constant $L/C$ ratio is to provide a substantially constant value of $Q_o$ as the inductance and capacitance and hence the resonant frequency is changed according to the formula:

$$f_r=\frac{1}{2\pi\sqrt{LC}}$$

Referring now to the apparatus, FIGURES 1 and 2 show an embodiment comprising a base plate 12 on which is mounted the inductor 1 and the capacitor 2. The inductor is connected to the capacitor by line 3, and the inductor and capacitor have terminal lines 6 and 7, respectively. The means for adjusting the inductor and capacitor are interconnected for simultaneous operation by means of the intermeshing gears indicated at 9.

The inductor supporting assembly comprises a pair of spaced vertical end plates 13 and 14 made of dielectric material and secured to the base plate 12 by L-shaped brackets 15. Two horizontal reinforcing rods 16 are connected to the end plates and the brackets by means of four screws 17, one such screw being visible at the lower left of FIGURE 1.

The inductor assembly comprises a pair of rectangular dielectric plates 20 held in spaced parallel relation by attachment to conductive metal end blocks 21 and 22. Axially aligned stub shafts 23 and 24 are secured to the centers of blocks 21 and 22 so that the shafts and blocks will rotate in unison on a common axis. The shafts are journaled in the end plates 13 and 14 and are provided with spacing sleeves 25 which prevent axial movement of the inductor assembly relative to the end plates. The coil, per se, of the inductor 1 comprises a length of metal strip or ribbon 26 wound helically around the plates 20 which are grooved to hold the turns of coil 26 properly separated. The turns of coil 26 have a large cross section and are made of low resistance metal such as copper, preferably coated with silver. The forward end of the coil is connected to end block 21 by a fork-shaped bracket 27 which is secured at its narrow end to the coil 26 and secured at its wide end to the block 21. The rear end of the coil is similarly connected to end block 22 by a fork-shaped bracket 28. The electrical connection is carried from the forward block 21 by a pair of metal contacts 29 which are connected to block 21 by a U-shaped metal bracket 30 having spring arms 31. The rear block 22 is similarly provided with a U-shaped metal bracket 32 carrying metal contacts 33. Contacts 29 slidably abut a stationary metal washer 34 so that as the inductor assembly is rotated the contacts wipe the face of the washer. Washer 34 is held in place by screws 35 which extend through end plate 13 and electrically connect the washer to a metal connecting bar 36 on the opposite side of the end plate from the washer. Terminal line 6 is electrically connected to bar 36 by a screw 37. In similar manner, the rear contacts 33 abut a metal washer 38 which is connected to a metal bar 39 by screws 40. Line 3, which connects inductor 1 to capacitor 2, is electrically connected to bar 39 by a screw 41.

In order to employ the described components in a parallel arrangement, terminal leads 6 and 7 are joined together which forms a parallel resonant circuit. Such circuit can be connected to associated circuitry by one line (not shown) attached to line 3, as by screw 41, and by another line (not shown) connected to the common connection of terminals 6 and 7. If a series resonant arrangement is desired, the leads 6 and 7 are individually joined to the associated circuitry, omitting the addition of an extra line at screw 41.

The inductor 1 is made adjustable by means of a shorting tap 43. The shorting tap comprises a U-shaped metal bracket 45 having two side metal spring fingers 46 and a third bottom metal spring finger 47 attached to the three inner sides of the U-shaped bracket and slidably abutting a metal guide bar 48. Guide bar 48 is stationary and is held in position by screws 44 which connect it between the end plates 13 and 14 adjacent their upper ends. A metal wing-shaped spring finger 49 is attached to the bottom of bracket 45 and carries at each tip a metal brush 50 which wipes the top of coil 26. A U-shaped follower 51 is attached to the bottom of bracket 45 so that the sides 52 of the follower slidably abut the sides of coil 26, only one such side 52 being visible in FIGURE 2. Thus, when coil 26 is rotated it forces follower 51 and therefore the entire bracket 45 to slide along the guide bar 48, with brushes 50 always contacting the coil 26 adjacent to the top of the turn of the coil which is in engagement with follower 51. The shorting line between the shorting tap 43 and the inductor terminal 6 is formed by a cable 52 and the length of guide bar 48 between the cable attaching screw 53 and the tap 43.

The capacitor 2 is a conventional vacuum dielectric adjustable capacitor; for example, the type disclosed in Patent No. 2,740,927, issued April 3, 1956, to Jo Emmett Jennings, et al. As shown in FIGURE 1 such a capacitor comprises in general a stationary set of cylindrical plates 56, and a movable set of cylindrical plates 57 telescopically received within the stationary set. The movable set 57 is carried on one end of an operating stem 58 and is sealed by a flexible metal bellows 59. The other end of stem 58 is threaded on an operating screw spindle 60. Stem 58 does not rotate but is supported for axial movement in a guide sleeve 61. Thus, when spindle 60 is rotated, it will cause the stem 58 to move along the axis of the capacitor to increase or decrease the overlapping relation of plates 56 and 57. More specifically, when spindle 60 is rotated counter-clockwise as viewed from the outer end of the spindle, stem 58 will move downwardly to increase the overlapping relation of plates 56 and 57, and thus increase the capacitance.

The capacitor carries a brazed-on mounting ring 63. An auxiliary mounting member 64 is placed over the end of the capacitor and secured to ring 63 by bolts 65 and spacing sleeves 66. The capacitor is mounted on the end plate 14 of the inductor support assembly by means of bolts 67 through plates 14 and 64. The right end of cable 3 is connected to the mounting member 64, and thus cable 3 is electrically connected to the movable plates 57.

The operating mechanism for the apparatus previously described comprises a vertical face member 70 on which is mounted a conventional dial mask 71 and a conventional dial gear box 72. An operating shaft 73 is journalled in box 72 and carries a crank-type turning knob 74 on its outer end. A dielectric gear 75 is secured on the inner end of shaft 73 and engages a large gear 76 secured on the inductor stub shaft 23. The rearward stub shaft 24 has secured thereon a gear 77 which engages a gear 78 secured on the capacitor spindle 60.

Operation of the apparatus to change the resonant frequency is accomplished by turning crank knob 74. More specifically when the knob is turned to rotate shaft 73 clockwise as viewed from the bottom of FIGURE 1, the inductor coil will be caused to rotate counter-clockwise. Such counter-clockwise rotation of coil 26 will force tap 43 to move toward the bottom of FIGURE 1 and thus increase the effective length of the coil to increase the inductance. At the same time, the capacitor spindle 60 is caused to rotate counter-clockwise as viewed from the outer end of the spindle, and as previously explained, such rotation causes the capacitance to increase. Since the inductance and capacitance are both caused to increase, the resonant frequency will decrease. Conversely, counter-clockwise rotation of knob 74 and shaft 73 will cause the inductance and capacitance to decrease and the resonant frequency to increase.

It should be understood that the variable inductor and capacitor and the interconnecting gearing are specifically designed so that any given rotation of knob 74 will change the inductance and capacitance in the same direction and by the same factor. Thus, if the inductance is increased ten percent, the capacitance is simultaneously also increased ten percent. In other words the apparatus is designed to provide inductance and capacitance curves which are parallel when plotted against turns of the tuning knob 74, as shown in FIGURE 2. This uniformity results in a constant $L/C$ ratio. In addition, coil 26 is designed to have relatively low resistance so that the $Q_o$ curve is substantially horizontal as shown in FIGURE 2, indicating substantially constant $Q_o$ with changing resonant frequency.

Figure 6:
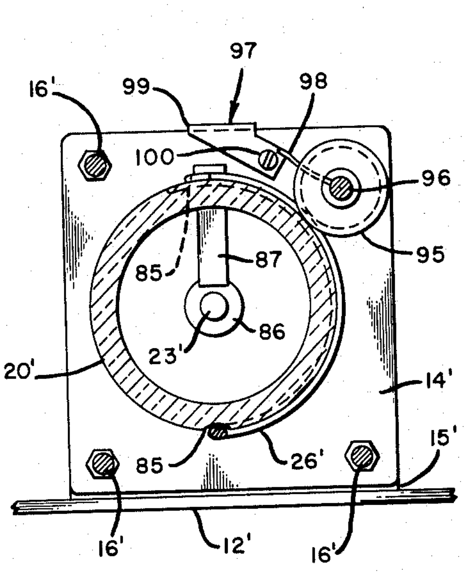
FIGURE 6 is a section view on the line 6—6 of FIGURE 5.

FIGURES 5 and 6 show the invention embodied in a somewhat different apparatus. In FIGURES 5 and 6, primed reference numbers are employed to designate parts which are similar to those in FIGURES 1 and 2, and the same reference numbers are employed to designate identical parts.

The apparatus of FIGURES 5 and 6 comprises a base plate 12′ on which is mounted an inductor 1′ and the capacitor 2. The inductor is connected to the capacitor by line 3′, and the inductor and capacitor have terminal ends 6′ and 7′, respectively. The means for adjusting the inductor and capacitor are interconnected by a direct drive connection indicated at 9′. As shown in FIGURE 5, the capacitor terminal 7′ is in the form of an L-shaped mounting bracket 83 so that the capacitor is electrically connected to the mounting plate 12′ of the chassis. Obviously, bracket 83 can be insulated from the mounting plate, and a separate terminal line (not shown) can be attached at one of the mounting screws 84 which connect the mounting plate to the end of the capacitor.

The inductor supporting assembly comprises a pair of dielectric end plates 13′ and 14′ mounted vertically on the base plate 12′ by L-shaped brackets 15′. Three horizontal reinforcing rods 16′ are connected to the end plates by nuts 17′, and the lower two rods 16′ pass through the brackets 15′.

The inductor assembly comprises a cylindrical drum 20′ made of dielectric material. Coaxial metal stub shafts 23′ and 24′ are secured in the ends of drum 20′ so that the shafts and drum will rotate together on a common axis. The coil, per se, of the inductor comprises a length of wire 26′ wound in a helical groove 85 in the surface of the drum. As shown in FIGURE 6 for the rear end of the drum, both of the stub shafts are provided inside the drum with a metal flange 86 to which is soldered one end of a metal strip 87. The other end of each strip 87 passes through the periphery of the drum and is soldered to an end of the coil 26′. The electrical connection at each end of the coil is carried from flange 86 through the stub shaft to a washer 88 secured to each shaft on the outside of the drum. The connection is completed at each end of the drum by a spring metal clip 89 connected to the adjacent dielectric end plate by a bolt 90. Also secured to bolt 90 is a metal connector strip 91 which extends through its respective end plate. Each clip 89 has a bifurcated U-shaped end 92 which straddles its respective shaft and firmly abuts the face of washer 88.

Terminal line 6′ is connected to the forward strip 91 via a wire 36′ and a bolt 37′. Line 3′ which connects the inductor 1′ to the capacitor 2 is soldered to the rear strip 91. In order to employ the described components in a parallel arrangement, terminal leads 6′ and 7′ are connected together which forms a parallel circuit. Such circuit can be connected to associated circuitry by a line (not shown) soldered with line 3′ to the rear strip 91 and another line connected to the common connection of terminals 6′ and 7′. If a series resonant arrangement is desired, the leads 6′ and 7′ are individually joined to the associated circuitry, omitting the addition of an extra line at the rear connector strip 91.

In the embodiment of FIGURES 5 and 6, the shorting tap 43′ comprises a grooved metal follower wheel 95 journalled on a metal guide shaft 96 for rotation about and movement along the shaft. Shaft 96 is secured at each end to a metal support member 97 comprising a spring arm 98 and a positioning lip 99. The rear support member is attached to the end plate 14′ by a bolt 100, and the forward support is attached to the end plate 13′ by the bolt 37′. The arrangement is such that arms 98 resiliently bias wheel 95 into firm engagement with coil wire 26′. Thus, when coil 26′ is rotated it forces follower wheel 95 to rotate around and slide along shaft 96. The shorting line between the shorting tap 43′ and the inductor terminal 6′ is formed by the bolt 37′, the forward support member 97, and the length of guide shaft 96 between the support member 97 and the follower wheel 95.

The capacitor 2 in FIGURE 5 is exactly like the capacitor 2 in FIGURE 1. In FIGURE 5, the mounting member 64 is omitted, and the mounting ring 63 is attached to a dielectric plate 102 by bolts 103 and 104. Plate 102 is mounted on the base plate 12′ by an L-shaped bracket 105. The arrangement is such that the capacitor 2 is mounted coaxially with the inductor drum 20′. The rear end of line 3′ is connected to ring 63 by bolt 103, and as shown in FIGURE 1 is thus electrically connected to the moveable capacitor plates 57. The capacitor spindle 60 is connected to stub shaft 24′ by a dielectric spacing sleeve 106 to provide an electrically isolated direct drive connection. As will be understood from the explanation of FIGURE 1, when spindle 60 is rotated clockwise, as viewed from the outer end of the spindle, the stem 58 will move outwardly to decrease the capacitance.

The operating mechanism for the apparatus of FIGURES 5 and 6 comprises a vertical face member 70′ on which is mounted a conventional dial mask 71′ and a conventional dial gear box 72′. An operating shaft 73′ is journalled in box 72′ and is connected to stub shaft 23′ by a dielectric spacing sleeve 107. An operating knob 74′ is mounted on the forward end of shaft 73′.

Operation of the apparatus of FIGURES 5 and 6 is accomplished by turning knob 74′. More specifically, when the knob is turned clockwise, as viewed from the forward end of FIGURE 6, the inductor coil 20′ and the capacitor spindle 60 are also rotated clockwise. Such clockwise rotation of coil 26′ forces tap 43′ to move toward the rear end of coil 26′, thus decreasing the effective length of the coil and decreasing the inductance. At the same time, the clockwise rotation of the capacitor spindle 60 will, as previously explained, decrease the capacitance. Since the inductance and capacitance are both caused to decrease, the resonant frequency will increase. Conversely, counter-clockwise rotation of knob 74′ will cause the inductance and capacitance to increase and the resonant frequency to decrease. As in the embodiment of FIGURE 1, the inductor and capacitor of FIGURE 5 are specifically designed so that any given rotation of knob 74′ will change the inductance and capacitance by the same factor, as indicated qualitatively in FIGURE 2.

Although preferred embodiments of the present invention are shown and described herein, it is to be understood that modifications may be made therein without departing from the spirit and scope of the invention as set forth in the appended claims. For example, other types of adjustable inductors and capacitors and operating mechanism therefor can be substituted for the specific apparatus shown and described in the drawings.

Having thus described the invention, what is claimed as new and desired to be secured by Letters Patent is:

1. Resonant circuit apparatus comprising a base, a pair of dielectric end plates mounted on said base in spaced parallel arrangement, a pair of metal end blocks carrying axially aligned stub shafts journaled in said end plates, a pair of dielectric connecting bars attached to the sides of said end blocks in spaced parallel arrangement, a metal inductor coil wound around said dielectric connecting bars and connected at its opposite ends to said metal end blocks, resiliently biased contacts connected to said end block, metal contact washers on said dielectric end plates and engaged by said contacts, a metal guide bar connected to said dielectric end plates outside said coil and parallel to the axis of said shafts, a metal U-shaped shorting tap straddling said bar with the bight of the U-shaped tap between the bar and the coil, metal spring fingers attached to each leg and the bight of the shorting tap in sliding engagement with the shorting bar, a U-shaped follower attached to the bight of the shorting tap and straddling a turn of said coil, a bowed spring finger attached to the bight of the shorting tap, an electrical contact brush on each end of said bowed finger in sliding engagement with said coil, a vacuum condenser comprising a movable set of cylindrical plates telescopically receivable within a stationary set of cylindrical plates, means for turning one of said stub shafts, and means connecting the other of said stub shafts to said condenser, said coil having an inductance curve versus turns of said turning means which is substantially parallel to the capacitance curve of said capacitor plotted versus turns of said turning means.

2. Resonant circuit apparatus comprising a base, a pair of dielectric end plates mounted on said base in spaced parallel arrangement, a dielectric cylinder positioned between said end plates, a metal inductor coil wound on said dielectric cylinder, a pair of stub shafts rotatably supporting said dielectric cylinder on said end plates, a metal contact washer on each end of said cylinder and connected to the adjacent end of said coil, a metal terminal clip attached to each of said dielectric end plates and having a spring finger abutting the adjacent contact washer, a guide rod extending along the outside of said coil, a shorting wheel rotatably and slidably received on said rod and having a grooved periphery engaging said coil, a supporting member at each end of said rod and having a spring arm at one end secured to said rod, each of said supporting members having a positioning lip at its opposite end overlapping the edge of its respective end plate, a screw connecting each said supporting member to its end plate intermediate said spring arm and positioning lip, a vacuum capacitor comprising a movable set of cylindrical plates telescopically receivable within a stationary set of cylindrical plates, and means for rotating said coil and moving said movable set of plates simultaneously while maintaining the inductance-to-capacitance ratio substantially constant.

References Cited by the Examiner

UNITED STATES PATENTS

| | | | |
|---|---|---|---|
| 2,147,245 | 2/1939 | Bock | 334—68 |
| 2,163,645 | 6/1939 | Ware | 336—141 |
| 2,178,221 | 10/1939 | Blancha | 336—141 |
| 2,398,112 | 4/1946 | O'Brien | 334—70 |
| 2,498,078 | 2/1950 | Harrison | 334—69 |
| 2,542,416 | 2/1951 | Kach et al. | 334—69 |
| 2,858,440 | 10/1958 | Giacoletto | 334—69 |
| 3,040,220 | 6/1962 | Neibaur | 317—245 |

HERMAN KARL SAALBACH, *Primary Examiner.*

ELI LIEBERMAN, *Examiner.*

R. F. HUNT, *Assistant Examiner.*